US009559930B2

(12) United States Patent
Yi et al.

(10) Patent No.: US 9,559,930 B2
(45) Date of Patent: Jan. 31, 2017

(54) METHOD AND APPARATUS FOR MEASURING A PACKET THROUGHPUT IN WIRELESS COMMUNICATION SYSTEM

(71) Applicant: LG ELECTRONICS INC., Seoul (KR)

(72) Inventors: Seungjune Yi, Seoul (KR); Youngdae Lee, Seoul (KR); Sungjun Park, Seoul (KR); Sunghoon Jung, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 6 days.

(21) Appl. No.: 14/415,419

(22) PCT Filed: Jul. 17, 2013

(86) PCT No.: PCT/KR2013/006377
§ 371 (c)(1),
(2) Date: Jan. 16, 2015

(87) PCT Pub. No.: WO2014/014260
PCT Pub. Date: Jan. 23, 2014

(65) Prior Publication Data
US 2015/0201339 A1 Jul. 16, 2015

Related U.S. Application Data

(60) Provisional application No. 61/672,725, filed on Jul. 17, 2012.

(51) Int. Cl.
*H04L 12/26* (2006.01)
*H04W 24/02* (2009.01)
(Continued)

(52) U.S. Cl.
CPC .......... *H04L 43/0888* (2013.01); *H04W 24/02* (2013.01); *H04W 24/08* (2013.01); *H04W 28/0278* (2013.01)

(58) Field of Classification Search
CPC ... H04W 24/08; H04W 24/02; H04L 43/0888; H04L 12/70
See application file for complete search history.

(56) References Cited

U.S. PATENT DOCUMENTS 6,473,399 B1 * 10/2002 Johansson ............. H04L 1/0002
370/229
6,615,050 B1 * 9/2003 Tiedemann, Jr. ...... H04B 1/707
455/522

(Continued)

OTHER PUBLICATIONS

ETSI TS 132 450 V10.1.0, "Universal Mobile Telecommunications System (UMTS); LTE; Telecommunication management; Key Performance Indicators (KPI) for Evolved Universal Terrestrial Radio Access Network (E-UTRAN); Definitions (3GPP TS 32.450 version 10.1.0 Release 10)", Jun. 2011.

(Continued)

*Primary Examiner* — Thai Nguyen
*Assistant Examiner* — Phong La
(74) *Attorney, Agent, or Firm* — Birch, Stewart, Kolasch & Birch, LLP

(57) ABSTRACT

A method and apparatus of measuring a packet throughput using a timer in a wireless communication system are provided. When determining a reference time for estimating packet throughput, a receiver determines the time that a data burst starts or ends using a timer in order to estimate the packet throughput considering a change in the data burst of the transmitter buffer. A measurement period is defined through the determined start time and end time of the data burst by the timer, and packet throughput is measured considering the total amount of the received data burst. The throughput of packet data may be estimated by each base station based on the same standard rule, so that the measured packet throughput values may be reliable, thus allowing the operator to make use of it as a parameter for MDT.

12 Claims, 7 Drawing Sheets

(51) Int. Cl.
*H04W 24/08* (2009.01)
*H04W 28/02* (2009.01)

(56) References Cited

U.S. PATENT DOCUMENTS

| | | | | |
|---|---|---|---|---|
| 2005/0289395 | A1* | 12/2005 | Katsuyama | H04L 41/0631 714/25 |
| 2008/0192623 | A1* | 8/2008 | Chen | H04M 7/1295 370/212 |
| 2008/0276281 | A1* | 11/2008 | Ogawa | G11B 15/026 725/50 |
| 2009/0086671 | A1* | 4/2009 | Pelletier | H04W 72/12 370/329 |
| 2009/0219951 | A1* | 9/2009 | Chun | H04W 8/26 370/474 |
| 2009/0232054 | A1* | 9/2009 | Wang | H04W 52/0225 370/328 |
| 2009/0274098 | A1* | 11/2009 | Chun | H04L 1/1635 370/328 |
| 2010/0002724 | A1* | 1/2010 | Turlington | H04L 12/4633 370/468 |
| 2010/0091728 | A1* | 4/2010 | Kim | H04L 5/0044 370/329 |
| 2010/0130216 | A1* | 5/2010 | Harada | H04W 72/1289 455/450 |
| 2010/0255784 | A1* | 10/2010 | Ido | H04N 1/00244 455/41.2 |
| 2011/0026400 | A1* | 2/2011 | Harrand | H04L 12/5695 370/235 |
| 2011/0149763 | A1* | 6/2011 | Bae | H04L 1/0002 370/252 |
| 2011/0194441 | A1* | 8/2011 | Jung | H04W 76/046 370/252 |
| 2011/0195668 | A1* | 8/2011 | Lee | H04W 24/10 455/67.11 |
| 2011/0222417 | A1* | 9/2011 | Watanabe | G06F 1/3209 370/252 |
| 2011/0222431 | A1* | 9/2011 | Oue | H04L 43/0852 370/252 |
| 2011/0269402 | A1 | 11/2011 | Yi et al. | |
| 2012/0063449 | A1* | 3/2012 | Frederic | H04L 69/162 370/389 |
| 2012/0076059 | A1* | 3/2012 | Wu | H04W 24/10 370/311 |
| 2012/0092998 | A1* | 4/2012 | Chang | H04W 24/10 370/241 |
| 2012/0108241 | A1* | 5/2012 | Wu | H04W 24/10 455/436 |
| 2012/0300629 | A1* | 11/2012 | Drucker | H04W 28/0205 370/235 |
| 2013/0007789 | A1* | 1/2013 | Wang | H04N 21/4263 725/14 |
| 2013/0084809 | A1 | 4/2013 | Johansson et al. | |
| 2013/0114446 | A1* | 5/2013 | Liu | H04W 24/10 370/252 |
| 2013/0130627 | A1* | 5/2013 | Fukuta | H04W 24/10 455/67.11 |
| 2013/0182583 | A1* | 7/2013 | Siomina | H04W 24/10 370/252 |
| 2014/0195596 | A1* | 7/2014 | Yamasaki | G06F 17/30902 709/203 |

OTHER PUBLICATIONS

ETSI TS 132 451 V10.0.0, "Universal Mobile Telecommunications System (UMTS); LTE; Telecommunication management; Key Performance Indicators (KPI) for Evolved Universal Terrestrial Radio Access Network (E-UTRAN); Definitions (3GPP TS 32.450 version 10.0.0 Release 10)", Apr. 2011.
Huawei, "Throughput Measurement", R2-102068, 3GPP TSG-RAN WG2 #69bis, Beijing, China, Apr. 12-16, 2010.
Interdigital, "Measurements for QoS Verification", R2-116217, 3GPP TSG-RAN WG2 Meeting #76, pp. 1-5, San Francisco, USA, Nov. 14-18, 2011.
Ericsson, "Define PDCP Throughput measurements," 3GPP TSG-SA5 (Telecom Management) Meeting SA5#67, S5-093472, Vancouver, BC, Canada, Aug. 31-Sep. 4, 2009, 1pg.
Huawei et al., "Discussion on MDT Throughput Measurement for UMTS," 3GPP TSG-RAN WG2 #77b, R2-121370, Jeju, Korea, Mar. 26-30, 2012, pp. 1-4.
LG Electronics, "Throughput and loss rate measurements for MDT QoS verification," 3GPP TSG-RAN WG2 Meeting #77, R2-120665, Dresden, Germany, Feb. 6-10, 2012, pp. 1-3.

\* cited by examiner

US 9,559,930 B2

METHOD AND APPARATUS FOR MEASURING A PACKET THROUGHPUT IN WIRELESS COMMUNICATION SYSTEM

CROSS REFERENCE TO RELATED APPLICATIONS

This application is the National Phase of PCT International Application No. PCT/KR2013/006377, filed on Jul. 17, 2013, which claims priority under 35 U.S.C. 119(e) to U.S. Provisional Application No. 61/672,725, filed on Jul. 17, 2012, all of which are hereby expressly incorporated by reference into the present application.

TECHNICAL FIELD

The present invention relates to wireless communications, and more specifically, to a method and apparatus for measuring a throughput for a data burst in a wireless communication system.

BACKGROUND ART

Commercialization of next-generation wireless communication systems, such as LTE (Long Term Evolution) systems, is being recently accelerated. The LTE systems are spread more quickly as respond to users' demand for services that may support higher quality and higher capacity while ensuring mobility, as well as voice services. The LTE system provides for low transmission delay, high transmission rate and system capacity, and enhanced coverage.

Meanwhile, telecommunication service providers try to grasp how well the quality of service (QoS) of UE(User Equipment)s is guaranteed in the LTE environment so as to enhance service quality. Rather than the QoS of a bearer as ensured by an actual network, the QoS, as users feel, is verified, and as a result, a standardization-related conference recently held suggests UE QoS verification for minimization of drive test (MDT) as a scheme of verifying service quality.

The MDT is a technology for a telecommunication service provider to optimize, network parameters, using measurement results of UEs present in a cell, and for achieving the purpose of MDT, an operator has conventionally used a vehicle to move place-to-place in the cell so as to measure the quality of the cell. However, the recent MDT uses measurement results of commercial UEs present in the cell so that the operator may minimize time and costs necessary for network optimization. In other words, while the existing MDT has been discussed primarily focusing on the cell coverage optimization, the discussion of the recent MDT is mainly oriented towards the QoS verification for verifying the quality of services that are provided by UEs. A parameter for the QoS verification is IP throughput for data.

However, the QoS verification scheme which is now in discussion does not provide a clarified definition on the measurement time for measuring the IP throughput. Under the situation where no measurement time is clearly defined, correct measurement is impossible.

Accordingly, a correct temporal definition is needed to estimate packet throughput considering actual data transmission and reception, and a specific scheme for measuring packet throughput taking into consideration a newly defined time of packet measurement is required.

DISCLOSURE OF INVENTION

Technical Problem

The present invention provides a method and apparatus for measuring a packet throughput using a timer in a wireless communication system.

The present invention also provides a method and apparatus that transmits a signal including a message for measuring a packet throughput in a wireless communication system.

The present invention also provides a method and apparatus for controlling an operation of a timer by confirming new transmission of a packet to measure a packet throughput in a wireless communication system.

The present invention also provides a method and apparatus for measuring a packet throughput by considering an amount of packet received in a measurement duration determined based on a timer in a wireless communication system.

Solution to Problem

In an aspect, a method for measuring a throughput using a timer in a wireless communication system is provided. The method includes determining, by a receiver, a start point at which a data burst begins using a timer, and determining, by the receiver, an end point at which the data burst ends using the timer, and measuring, by the receiver, a throughput of the data burst based on the start point and the end point. Wherein the start point (T2) is a point in time when a first transmission begins after the receiver estimates that a transmitter's buffer size becomes greater than zero for a radio bearer of the transmitter, and the end point (T1) is a point in time when the receiver estimates that the transmitter's buffer size becomes zero for a radio bearer of the transmitter.

In another aspect, a wireless device for performing a measurement of a throughput in a wireless communication system is provided. The wireless device includes a radio frequency (RF) unit for receiving a radio signal and a processor, operatively coupled with the RF unit, configured to determine a start point at which a data burst begins and an end point at which the data burst ends and measure a throughput of the data burst based on the start point and the end point. wherein the start point is a point in time when the timer starts to run by checking that a first data block for the data burst is received from a transmitter, and the end point is a point in time when the timer expires after the timer runs with a predetermined value, and; wherein the start point is a point in time when the timer starts to run after receiving the first data block to indicate that a transmitter's buffer size becomes greater than zero for at least one radio bearer of the transmitter, and the end point is a point in time when the timer expires after receiving a last data block to indicate that the transmitter's buffer size becomes zero for all radio bearers of the transmitter.

Advantageous Effects of Invention

Using a timer for measuring a throughput of IP may be apparently determined, a measurement period, and the packet amount may be estimated in the determined measurement period, thus resulting in verification of the IP throughput for data burst being correctly conducted. Accordingly, the base station may efficiently control and manage status link wireless resources of the UE.

Further, in relation to measuring a throughput of data burst(IP packet), each eNB applies the same standard to define the start and end times of data burst using the timer, thus ensuring reliability of the value of packet IP throughput as measured by each eNB. By doing so, the present invention may be used for an MDT purpose that enables operators to verify packet throughput, and service quality of the whole system may be enhanced.

MODE FOR THE INVENTION

Figure 1:
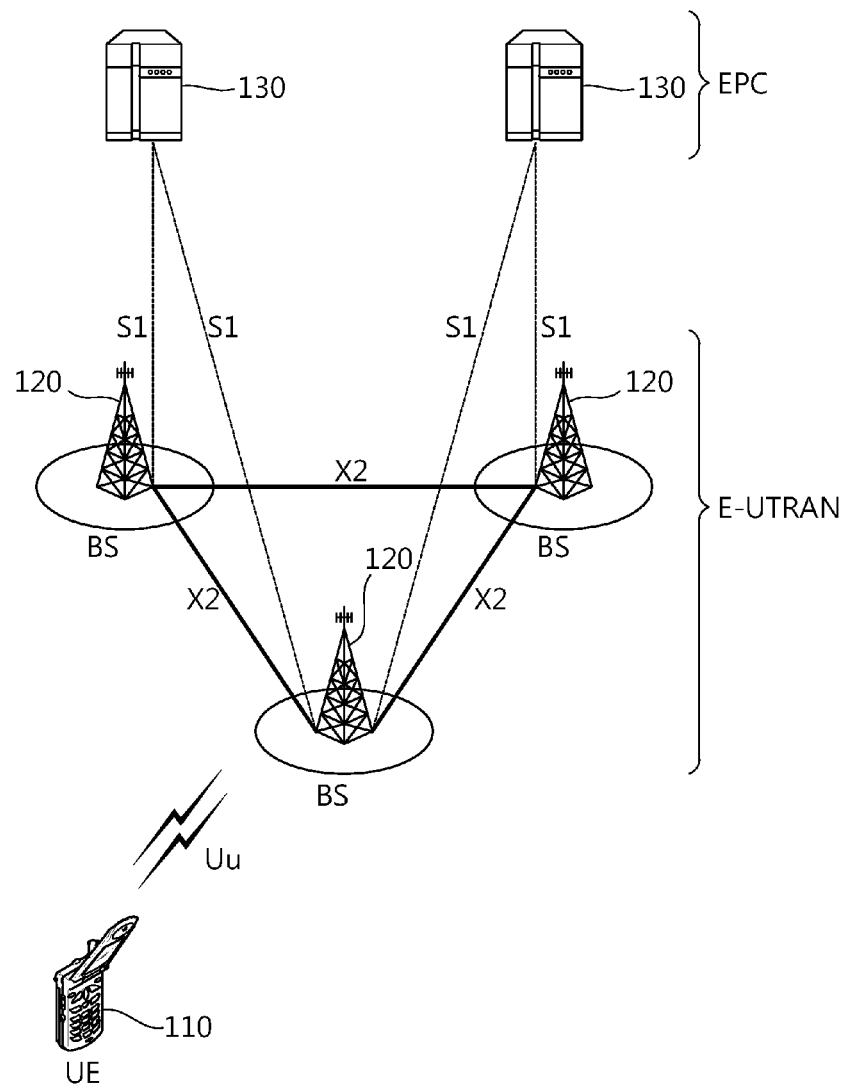
FIG. 1 shows a wireless communication system to which the present invention is applied.

FIG. 1 shows a wireless communication system to which the present invention is applied. The wireless communication system may also be referred to as an evolved-UMTS terrestrial radio access network (E-UTRAN) or a long term evolution (LTE)/LTE-A system.

First, the LTE system architecture may generally consist of E-UTRAN (Evolved UMTS Terrestrial Radio Access Network) and EPC (Evolved Packet Core).

The E-UTRAN includes at least one evolved Node-B (eNB) 20 which provides a control plane and a user plane to a user equipment (UE) 10. The UE 10 may be fixed or mobile, and may be referred to as another terminology, such as a mobile station (MS), a user terminal (UT), a subscriber station (SS), a mobile terminal (MT), a wireless device, etc. The eNB 20 is generally a fixed station that communicates with the UE 10 and may be referred to as another terminology, such as a base station (BS), a base transceiver system (BTS), an access point, etc.

The eNBs 20 are interconnected by means of an X2 interface. The eNB s 20 are also connected by means of an S1 interface to an evolved packet core (EPC) 30, more specifically, to a mobility management entity (MME) through S1-MME and to a serving gateway (S-GW) through S1-U. Herein the MME hosts Control-plane functions and the S-GW hosts User-plane functions.

The EPC 30 includes an MME, an S-GW, and a packet data network-gateway (P-GW). The MME has access information of the UE or capability information of the UE, and such information is generally used for mobility management of the UE. The S-GW is a gateway having an E-UTRAN as an end point. The P-GW is a gateway having a PDN as an end point.

Layers of a radio interface protocol between the UE and the network can be classified into a first layer (L1), a second layer (L2), and a third layer (L3) based on the lower three layers of the open system interconnection (OSI) model that is well-known in the communication system. Among them, a physical (PHY) layer belonging to the first layer provides an information transfer service by using a physical channel, and a radio resource control (RRC) layer belonging to the third layer serves to control a radio resource between the UE and the network. For this, the RRC layer exchanges an RRC message between the UE and the BS.

Figure 2:
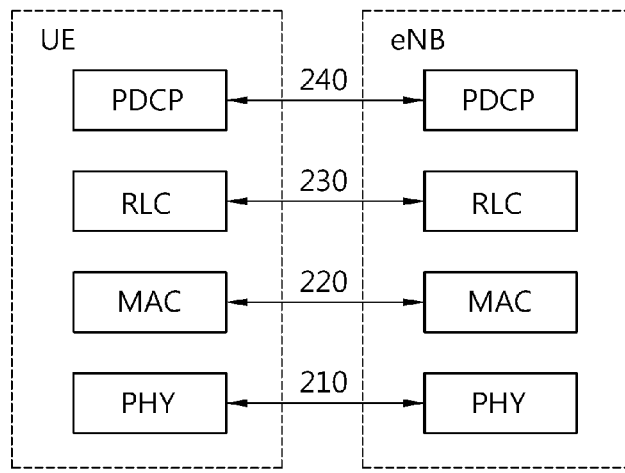
FIG. 2 is a block diagram illustrating a radio protocol architecture for a user plane to which the present invention is applied.
Figure 3:
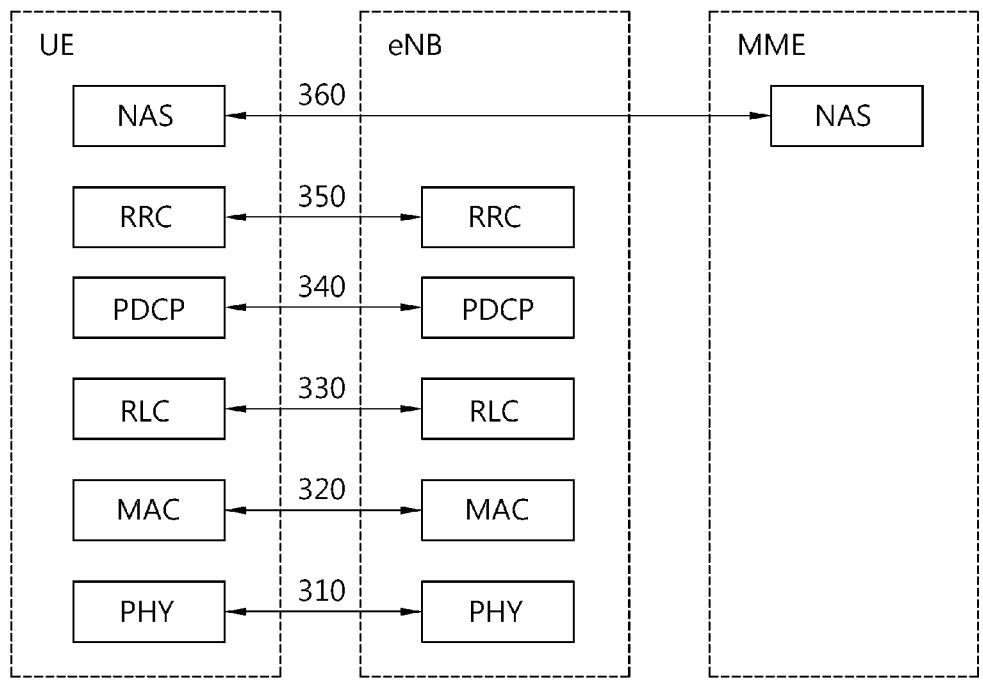
FIG. 3 is a block diagram illustrating a radio protocol architecture for a control plane to which the present invention is applied.

FIG. 2 is a diagram showing a radio protocol architecture for a user plane. FIG. 3 is a diagram showing a radio protocol architecture for a control plane. The user plane is a protocol stack for user data transmission. The control plane is a protocol stack for control signal transmission.

Referring to FIGS. 2 and 3, a PHY layer (210, 310) provides an upper layer with an information transfer service through a physical channel. The PHY layer is connected to a medium access control (MAC) layer (220, 320) which is an upper layer of the PHY layer through a transport channel. Data is transferred between the MAC layer and the PHY layer through the transport channel. The transport channel is classified according to how and with what characteristics data is transferred through a radio interface.

Between different PHY layers, i.e., a PHY layer of a transmitter and a PHY layer of a receiver, data is transferred through the physical channel. The physical channel may be modulated using an orthogonal frequency division multiplexing (OFDM) scheme, and may utilize time and frequency as a radio resource.

Functions of the MAC layer include mapping between a logical channel and a transport channel and multiplexing/de-multiplexing on a transport block provided to a physical channel over a transport channel of a MAC service data unit (SDU) belonging to the logical channel. The MAC layer provides a service to a radio link control (RLC) layer (230, 330) through the logical channel.

Functions of the RLC layer include RLC SDU concatenation, segmentation, and reassembly. To ensure a variety of quality of service (QoS) required by a radio bearer (RB), the RLC layer provides three operation modes, i.e., a transparent mode (TM), an unacknowledged mode (UM), and an acknowledged mode (AM). The AM RLC provides error correction by using an automatic repeat request (ARQ).

Functions of a packet data convergence protocol (PDCP) layer (240, 340) in the user plane include user data delivery, header compression, and ciphering. Functions of a PDCP layer in the control plane include control-plane data delivery and ciphering/integrity protection.

A radio resource control (RRC) layer (350) is defined only in the control plane. The RRC layer serves to control the logical channel, the transport channel, and the physical channel in association with configuration, reconfiguration and release of radio bearers (RBs). An RB is a logical path provided by the first layer (i.e., the PHY layer) and the second layer (i.e., the MAC layer, the RLC layer, and the PDCP layer) for data delivery between the UE and the network.

The setup of the RB implies a process for specifying a radio protocol layer and channel properties to provide a particular service and for determining respective detailed parameters and operations. The RB can be classified into two types, i.e., a signaling RB (SRB) and a data RB (DRB). The SRB is used as a path for transmitting an RRC message in the control plane. The DRB is used as a path for transmitting user data in the user plane.

When an RRC connection is established between an RRC layer of the UE and an RRC layer of the network, the UE is in an RRC connected state (also may be referred to as an RRC connected mode), and otherwise the UE is in an RRC idle state (also may be referred to as an RRC idle mode).

NAS control protocol (360) performs EPS bearer management, Authentication or Security control at terminated in MME on the network side.

Data is transmitted from the network to the UE through a downlink transport channel. Examples of the downlink transport channel include a broadcast channel (BCH) for transmitting system information and a downlink-shared channel (SCH) for transmitting user traffic or control messages. The user traffic of downlink multicast or broadcast services or the control messages can be transmitted on the downlink-SCH or an additional downlink multicast channel (MCH). Data is transmitted from the UE to the network through an uplink transport channel. Examples of the uplink transport channel include a random access channel (RACH) for transmitting an initial control message and an uplink SCH for transmitting user traffic or control messages.

Examples of logical channels belonging to a higher channel of the transport channel and mapped onto the transport channels include a broadcast channel (BCCH), a paging control channel (PCCH), a common control channel (CCCH), a multicast control channel (MCCH), a multicast traffic channel (MTCH), etc.

The physical channel includes several OFDM symbols in a time domain and several subcarriers in a frequency domain. One subframe includes a plurality of OFDM symbols in the time domain. A resource block is a resource allocation unit, and includes a plurality of OFDM symbols and a plurality of subcarriers. Further, each subframe may use particular subcarriers of particular OFDM symbols (e.g., a first OFDM symbol) of a corresponding subframe for a physical downlink control channel (PDCCH), i.e., an L1/L2 control channel. A transmission time interval (TTI) is a unit time of subframe transmission.

For efficiently using uplink wireless resources, an eNB should recognize what type of data and how much data is transmitted per user. Since, in the case of downlink wireless resources, downlink data is transferred from an access gateway to the eNB, the eNB may grasp how much downlink data is transmitted to each user. However, in the case of uplink, data is generated from a UE (User Equipment), and accordingly, there is no other way but to identify and grasp data reported from each UE.

Further, the eNB is supposed to efficiently use the wireless resources by verifying packet throughputs of UEs that are serviced by an operator, i.e., by determining which UE has a high throughput and which UE has a low throughput. That is, the eNB tries to maximally guarantee per-UE service quality of the operator. For such purpose, the eNB needs to clearly perform data measurement for ensuring service quality for each UE. At this time, in case burst data which abruptly occurs is not correctly measured, that is when measurement is not exactly done for data burst, for example, when the start and end of data burst each are determined by each eNB, reliability may be difficult to secure on values measured by eNBs different from each other.

Accordingly, to verify packet throughput of a UE, a scheme of correctly measuring packet throughput in consideration of per-packet E-RAB or QCI serviced to the UE is suggested in which times that the packet starts and ends being generated are defined and packet measurement is conducted considering the defined times.

More specifically, the eNB estimates packet throughput by receiving data burst that is packets transmitted from a UE during multiple TTIs. At this time, a measurement period for estimating the packet throughput is set using the time that the transmission of the data burst starts and the time that the transmission of the data burst ends, and packet throughput is estimated using the set measurement period and the received data burst.

Here, the data burst includes data transmitted through at least one or more E-RABs for the UE. The E-RAB identifies the concatenation of an S1 Bearer and the corresponding Data Radio Bearer (or the corresponding radio bearer). When an E-RAB exists, there is a one-to-one mapping between this E-RAB and an EPS bearer of the Non Access Stratum.

Figure 4:
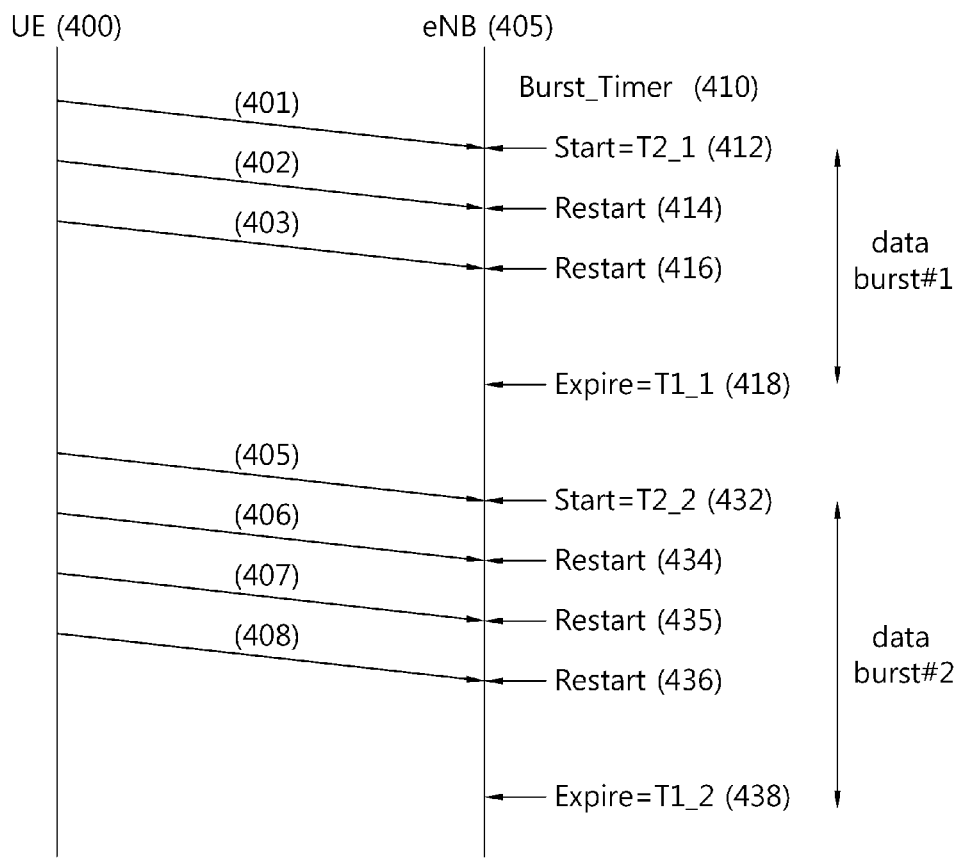
FIG. 4 schematically shows a method of measuring a data burst throughput using a timer according to an embodiment of the present invention.

FIG. 4 shows a scheme of measuring a IP throughput according to an embodiment of the present invention.

Referring to FIG. 4, a UE 400 transmits packet data generated in a UE buffer through a plurality of TTIs (steps 401~40N). In this case, the packet data generated from the UE is segmented and split across the several TTIs and is then transmitted to an eNB 450. Herein, the packet data may also be referred to as a data burst. The data burst is transmitted as a data block having a size determined in each TTI. The eNB 450 receives data blocks through several TTIs.

In this case, the eNB 450 sets a timer to measure a throughput of the data burst, and controls a start/restart/end of the timer as a Burst_Timer on the basis of reception of the data block. Herein, according to the present invention, the timer used for the throughput of the data burst is called the Burst_Timer. The Burst_Timer is used by the receiver (eNB for UL, UE for DL) to detect a data burst and define a measurement time for IP throughput of the data burst.

The eNB 450 prepares to drive the Burst_Timer with a predetermined value (step 410). Then, the eNB 450 waits for data reception. If a data block is received from the UE in a situation (step 401), the Burst_Timer starts and a time at which corresponding timing is driven is set to T2 (step 412). If a new data block is received from the UE during the Burst_Timer is running (steps 402 and 403), the Burst_Timer restarts (steps 414 and 416).

Meanwhile, if the new data block is not received from the UE until the predetermined value of the Burst_Timer expires, the eNB 450 stops the Burst_Timer, and sets a corresponding time to T1 (step 418).

Thereafter, if the new data block is received again from the UE when the Burst_Timer does not run, the eNB 450 determines that a new data burst #2 is generated in the UE 400, starts the Burst_Timer, and sets a time at which corresponding time is driven to T2 for the next data burst #2 (step 432). Then, if a data block is received from the UE during the Burst_Timer is running in regard to the data burst #2 (steps 405, 406, 407, and 408, the Burst_Timer restarts (steps 434, 435, and 436). Thereafter, if the new data block is not received from the UE until the predetermined value of the Burst_Timer expires, the eNB 450 stops the Burst_Timer and sets a corresponding time to T1_2 (step 438).

It is assumed in the present invention for example that a data burst #1 and a data burst #2 are present as a data burst in one measurement duration with respect to the UE. The eNB may set T2 412 for the data burst #1 to T2_$_{-1}$, and may set T1 418 to T1_1. In addition, T2 432 for the data burst #2 may be set to T2_2, and T1 438 may be set to T1_2. Herein, the eNB may define a start/end time for each data burst distinctively by considering the number of data bursts generated from the UE.

In other words, one Burst_Timer driven with any value may set the T2 and the T1 by checking for a start/end in accordance with each data burst. Alternatively, a separate Burst_Timer may exist in accordance with each data burst and thus set each of the T2 and the T1 for a corresponding data burst. Herein, a timer value which is set to the timer may be the same value according to each data burst, or may be a different value according to a property of the data burst. However, with respect to each data burst, all eNBs have the same value, and measure a packet throughput of respective UEs according to the same criterion.

Therefore, if a data burst exists in the example of FIG. 4 during the measurement duration (or period), a scheduled IP through in the measurement duration (or period), can be calculated by the following equation.

ThpTimeUL1=T2_1-T1_1

ThpVolUL1=Data volume received between T2_1 and T1_1 counted on PDCP SDU level

ThpTimeUL2=T2_2-T1_2

ThpVolUL2=Data volume received between T2_2 and T1_2 counted on PDCP SDU level

Scheduled IP throughput=(ThpVolUL1+ThpVolUL2)/ (ThpTimeUL1+ThpTimeUL2)     <Equation 1>

The above operation can be performed in one of Layer 2 radio protocols, i.e. MAC (HARM), RLC, or PDCP. For MAC, the operation is applied to a UE, and for RLC and PDCP, the operation is applied to each RB.

The data block can be one of MAC PDU, MAC SDU, RLC PDU, RLC SDU, PDCP PDU, or PDCP SDU.

The layer 2 control PDUs (e.g. MAC Control Element, RLC Control PDU, PDCP Control PDU) are not considered as data blocks, so the Burst_Timer operation is not applied to the layer 2 control PDUs.

Hereinafter, data blocks to which the present invention is applied will be described in brief.

Figure 5:
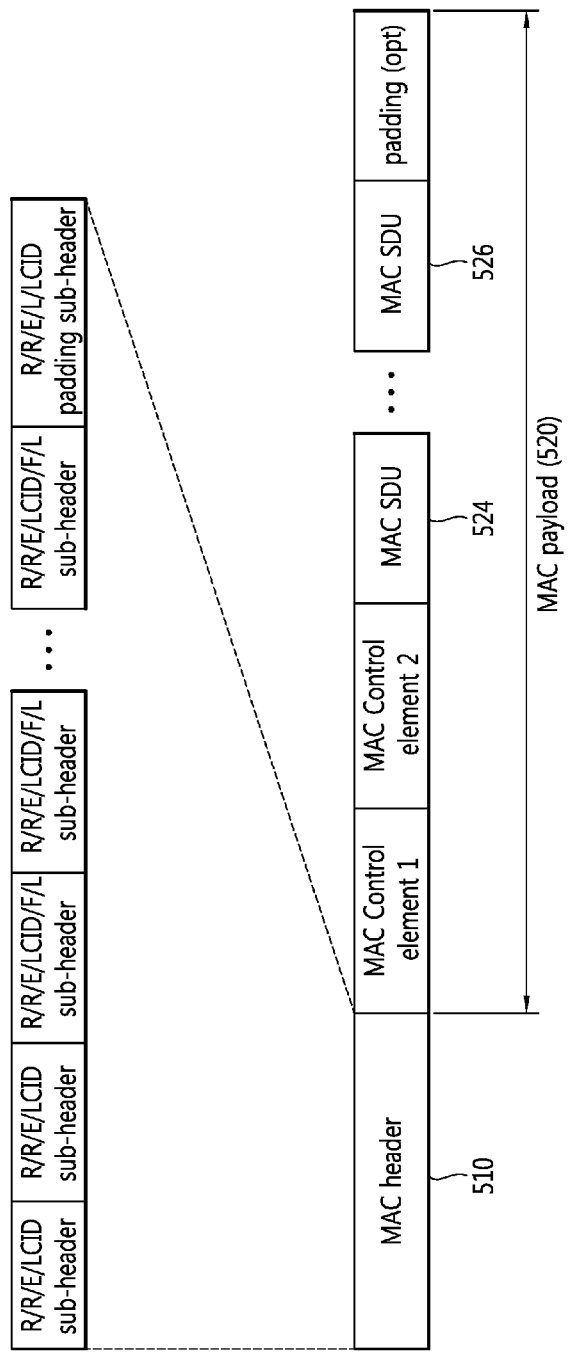
FIG. 5 shows a structure of a medium access control (MAC) packet data unit (PDU) to which the present invention is applied.

FIG. 5 shows an exemplary structure of a MAC PDU to be described in brief. The UE shall multiplex MAC control elements and MAC SDUs in a MAC PDU.

Referring FIG. 5, A MAC PDU consists of a MAC header(510), zero or more MAC Service Data Units (MAC SDU)(524, 526), zero, or more MAC control elements, and optionally padding; as described MAC payload(520). Both the MAC header(510) and the MAC SDUs(524, 526) are of variable sizes.

A MAC PDU header(510) consists of one or more MAC PDU subheaders; MAC PDU subheaders have the same order as the corresponding MAC SDUs, MAC control elements and padding.

MAC SDUs(524, 526) are bit strings that are byte aligned (i.e. multiple of 8 bits) in length. An SDU is included into a MAC PDU from the first bit onward. A maximum of one MAC PDU can be transmitted per TB per UE. A maximum of one MCH MAC PDU can be transmitted per TTI.

Meanwhile, a relation between an RLC PDU and an RLC SDU will be described hereinafter in regard to the MAC SDU. A receiving-side RLC layer restores data received from a lower layer, i.e., a MAC layer, to original data and thereafter delivers it to a higher layer, i.e., a PDCH layer. Therefore, data exchanged between the RLC layer and the MAC layer may be referred to as an 'RLC PDU', and data exchanged between the RLC layer and the PDCP layer may be referred to as an 'RLC SDU'.

Figure 6:
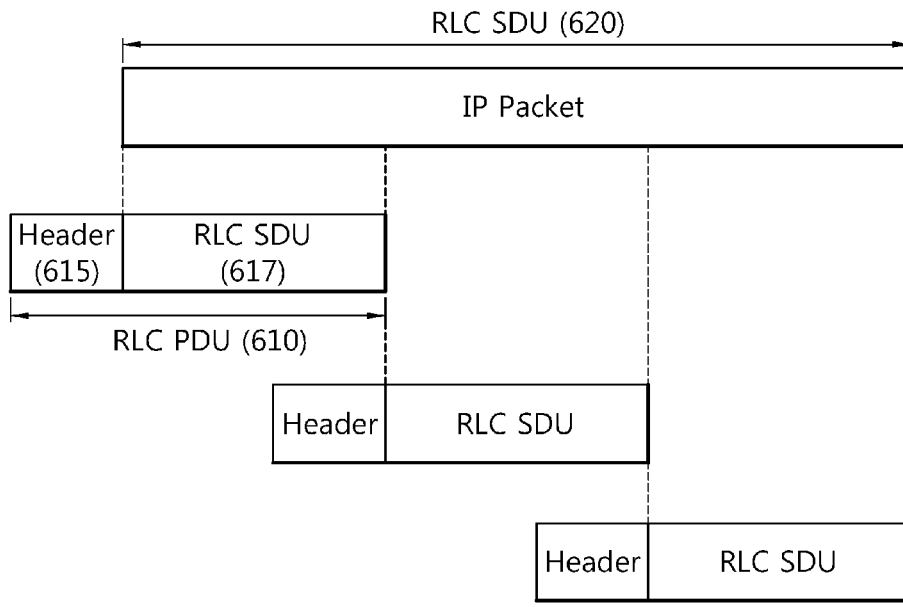
FIG. 6 shows a structure of a radio link control (RLC) PDU and an RLC service data unit (SDU) to which the present invention is applied.

FIG. 6 shows a structure of an RLC PDU and an RLC SDU to which the present invention is applied.

Referring to FIG. 6, RLC PDUs can be configured by framing an RLC SDU 620 in a transmitting-side RLC layer. For example, an IP packet with a size of 100 bytes (i.e., a PDCH PDU received from a higher layer), and a size of transmissible data must be 40 bytes so as to be transmitted through a wireless channel. Such a process is called framing. Accordingly, the transmitting-side RLC layer reconfigures the RLC SDU with the size of 100 bytes into three RLC PDUs 610 having a size of 40 bytes, and an RLC header 615 is added to each of the RLC PDUs 610.

In this case, the RLC header 615 may include a sequence number (SN) field for indicating an order of a data block in regard to the framing operation, and according to the segmentation operation, may include a length indicator (LI) field for indicating the beginning and/or end of data, information for indicating a presence/absence of next data, or the like (The FI field indicates whether a RLC SDU is segmented at the beginning and/or at the end of the Data field). Herein, the SN field has an SN value which monotonically increases by 1 per RLC PDU.

That is, the receiving-side RLC layer uses an L1 field, SN field, etc., in the header 615 of the first RLC PDU 610 to determine whether a received RLC SDU 225 corresponds to a first segment, an intermediary segment, or a last segment, etc., and also confirms necessity of retransmission to determine whether data reception for the RLC SDU needs to be waited for, etc. For example, if any RLC SDU is transmitted by being segmented into three RLC PDUs, each RLC PDU is stored in the receiving buffer 335 until the arrival of all of the three RLC PDUs. Therefore, a data field of the three RLC PDUs 610 is configured to combine segments of an extracted SDU thereof, and thus is completely reconfigured to a concrete RLC SDU. Then, it is delivered to a higher layer, i.e., a PDCH layer.

Therefore, the receiving-side RLC layer according to the present invention receives the RLC PDUs 610, sequentially arranges the RLC PDUs 610 by referring to the SN, and controls an end and/or start, etc., of an operation of a timer by considering reception of each RLC PDU.

Figure 7:
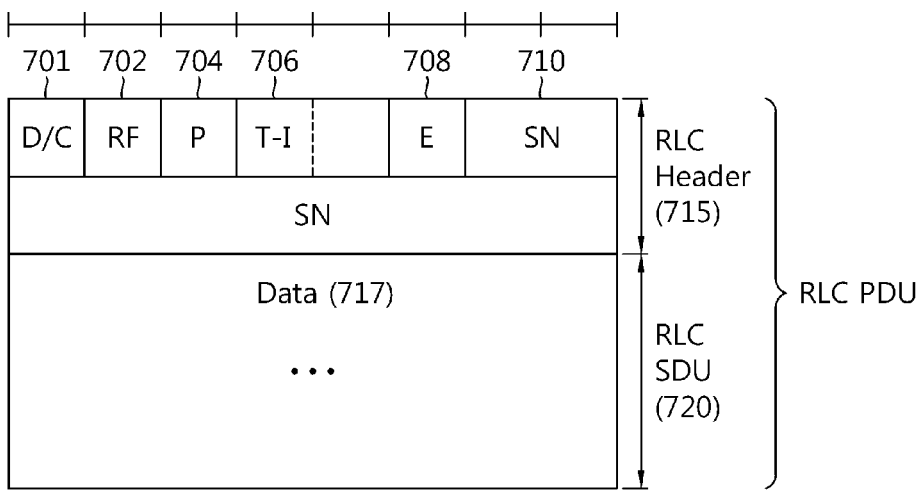
FIG. 7 shows an exemplary structure of an RLC PDU to which the present invention is applied.

FIG. 7 shows a structure of an RLC PDU to be described in greater detail. In this case, a PDU not considering a segment is descried for example, and an AM mode is assumed.

Referring FIG. 7, AMD PDU consists of a Data field(720) and an AMD PDU header(715). AMD PDU header consists of a fixed part (fields that are present for every AMD PDU) and an extension part (fields that are present for an AMD PDU when necessary). The fixed part of the AMD PDU header itself is byte aligned and consists of a D/C(701), a RF(702), a P(703), a FI(704), an E(705) and a SN(706). The extension part of the AMD PDU header itself is byte aligned and consists of E(s) and LI(s).

An AMD PDU header consists of an extension part only when more than one Data field elements are present in the AMD PDU, in which case an E and a LI are present for every Data field element except the last. Furthermore, when an AMD PDU header consists of an odd number of LI(s), four padding bits follow after the last LI.

Herein, The SN(706) field indicates the sequence number of the corresponding AMD PDU. For an AMD PDU segment, the SN field indicates the sequence number of the original AMD PDU from which the AMD PDU segment was constructed from. The sequence number is incremented by one for every AMD PDU. The E(705) field indicates whether Data field follows or a set of E field and LI field follows with 1 bit. The FI(703) field indicates whether a RLC SDU is segmented at the beginning and/or at the end of the Data field. Specifically, the FI field indicates whether the first byte of the Data field corresponds to the first byte of a RLC SDU, and whether the last byte of the Data field corresponds to the last byte of a RLC SDU. The P(703) field indicates whether or not the transmitting side of an AM RLC entity requests a STATUS report from its peer AM RLC entity. The RF(702) field indicates whether the RLC PDU is an AMD PDU or AMD PDU segment. The D/C(701) field indicates whether the RLC PDU is a RLC data PDU or RLC control PDU.

That is, when the receiving side of an AM RLC entity receives RLC data PDUs, it shall detect whether or not the RLC data PDUs have been received in duplication, and discard duplicated RLC data PDUs, reorder the RLC data PDUs with checking the SN(706) if they are received out of sequence. It detects the loss of RLC data PDUs at lower layers and request retransmissions to its peer AM RLC entity, and reassembles RLC SDUs from the reordered RLC data PDUs with corresponding information in the header (715) and deliver the RLC SDUs to upper layer, PDCH layer, in sequence.

Figure 8:
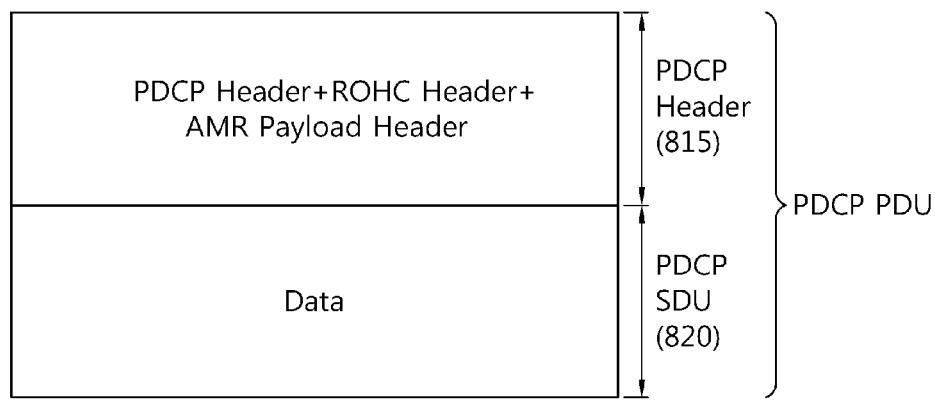
FIG. 8 shows an exemplary structure of a packet data convergence protocol (PDCP) PDU to which the present invention is applied.

FIG. 8 shows a structure of a PDCP SDU and a PDCH PDU to which the present invention is applied.

Referring to FIG. 8, a receiving-side PDCP layer deciphers an RLC SDU, i.e., a PDCP PDU, delivered from an RLC layer, to restore a header, and thereafter generates a PDCP SDU and delivers it to a higher layer. The PDCP SDU may be referred to as an IP packet.

In this case, the PDCP PDU uses a ciphering PDCP SN stored in a PDCP SN field to decipher the PDCP PDU. The deciphered PDCP PDU is subjected to proper processing, for example, header restoration, etc., to create a PDCP SDU, and thereafter the PDCP SDU is delivered to a higher layer. Herein, header compression and header restoration of the IP packet are performed by using a robust header compression (ROHC) protocol. The ROHC header compression is variable in its structure and size depending on an actual compression operation state, and includes a process of the SN acquisition and error detection. Herein, the PDCP SN is subjected to a process of confirming a ciphered text obtained by converting data that can be interpreted by a third person into data that cannot be interpreted by the third person, by using a specific ciphering key for the PDCP SDU though the deciphering process and an SN which increases by 1 per packet.

In the present invention, a data block received in regard to a start/restart/control, etc., of a timer may be any one of those shown in FIG. 5 to FIG. 8, and it is considered that HARQ is applied in case of a MAC layer according to an operation of each entity, whereas it is assumed that a data block to be retransmitted in the data block of the above process is not taken into account. That is, according to the present invention, a Burst_Timer operation for data reception in the MAC layer is applied only for first transmission of a new data block. Meanwhile, if the Burst_Timer is used in an AM RLC, an expiry operation may be controlled by considering retransmission of the AM RLC. In addition, when operating in the MAC, the Burst_Timer is used for per-UE data burst, and when operating in the RLC or the PDCP, this timer is used for per-RB data burst.

Figure 9:
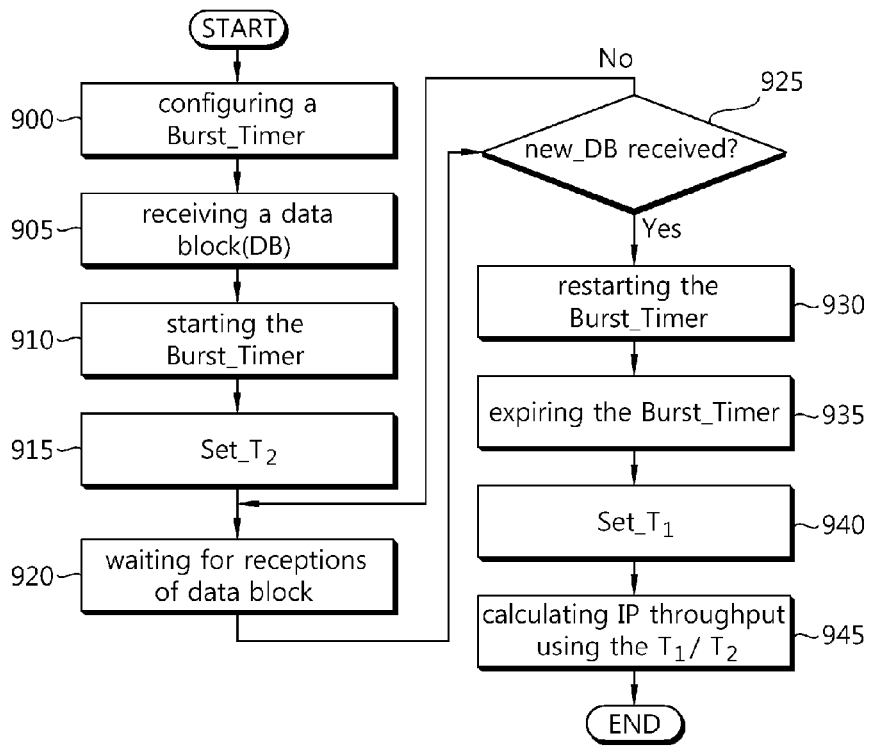
FIG. 9 is a flowchart showing an operation of a base station for determining a start/end time point of a data burst using a timer according to an embodiment of the present invention.

FIG. 9 is a flowchart showing an operation of a base station for determining a start/end point of a data burst using a timer according to an embodiment of the present invention.

Referring to FIG. 9, Burst_Timer is set by the receiver (eNB for UL, UE for DL) to determine a start point at which a data burst begins and an end point at which the data burst ends (900). The value of the Burst_Timer is signalled from eNB to UE by one of RRC message, MAC Control PDU, RLC Control PDU, or PDCP Control PDU.

When the receiver receives a data block (905) while the Burst_Timer is not running, the receiver shall start the Burst_Timer(910) or Set T2 to the time that the Burst_Timer starts (or the time the receiver receives the data block)(915). Herein T2 is a start point at which a data burst begins; the start point is a point in time when the timer starts to run by detecting that a first data block for the data burst is received successfully from a transmitter. And the start point also can be a point in time when the timer starts to run after receiving the first data block successfully to indicate that a transmitter's buffer size becomes greater than zero for at least one radio bearer of the transmitter, especially a RLC layer or a PDCP layer.

When the receiver receives a data block while the Burst_Timer is running, the receiver shall restart the Burst_Timer (930), That is, when the receiver waits for receptions of data block after setting the step 915 and detects new data transmission from the transmitter, the Burst_Timer restart (930).

When the receiver does not receive any more data blocks while the Burst_Timer was running, the Burst_Timer expires with a predetermined value (935), the receiver shall set the time that the Burst_Timer expires to T1 (940). Herein the T1 is an end point at which the data burst ends; the end point is a point in time when the timer expires after the timer runs with a predetermined value. And the end point also can be a point in time when the timer expires with a set value after receiving a last data block successfully to indicate that the transmitter's buffer size becomes zero for all radio bearers of the transmitter, especially a RLC layer or a PDCP layer.

The receiver decides the measurement time of the data burst using the set T1 and T2, i.e. ThpTimeUL, as T1 - T2. The receiver calculates the throughput of the data burst as [(volume of successfully received PDCP SDUs during ThpTimeUL)/ThpTimeUL] following an <equation 2>.

$$\text{If} \sum ThpTimeU1 > 0, \quad \text{\langle Equation 2\rangle}$$

$$\frac{\sum ThpVolU1}{\sum ThpTimeU1} \times 1000 [kbits/s]$$

$$\text{If} \sum ThpTimeU1 = 0, 0[kbits/s]$$

If the above operation is performed in MAC HARQ, the data block may be limited to a new data block, i.e. only the initial transmission is considered and retransmission is not considered. If the above operation is performed in AM RLC, the behavior at Burst_Timer expiry is changed as below to cope with possible RLC retransmission.

When the Burst_Timer expires, the receiver shall restart the Burst_Timer if an RLC Data PDU remains in the reception buffer (i.e. out-of-sequence RLC Data PDU). Else Set T1 to the time the Burst_Timer expires.

Accordingly, upon measuring the uplink packet, different base stations may calculate the scheduled IP throughput of each UE based on a consistent standard with respect to the bursty traffic of each UE, thus allowing the present invention to fit for the MDT purpose of the operator verifying the throughput of the UEs which are serviced by the operator.

Figure 10:
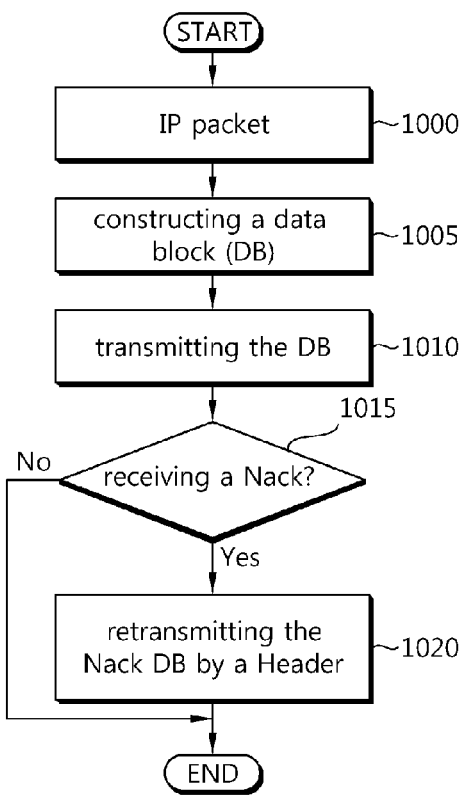
FIG. 10 is a flowchart showing an operation of a user equipment for transmitting data according to an embodiment of the present invention.

FIG. 10 is a flowchart showing an operation of a user equipment for transmitting data according to an embodiment of the present invention.

Referring to FIG. 10, the UE confirms an IP packet received from a higher layer (step 1000). In this case, each corresponding entity performs a segment/concatenation operation by considering a size of a data block to be transmitted through a wireless channel (step 1005). The configured data block is transmitted (step 1010).

Meanwhile, upon receiving Nack from a transmitting side as notification information for indicating incorrect reception of a corresponding data block (step 1015), header information of a previously transmitted data block is confirmed, and the data block of the Nack is retransmitted (step 1020). Each entity according to the present invention may confirm SN information of header information corresponding to an SDU of a corresponding data block, and thus may rearrange an order of the data block.

Figure 11:
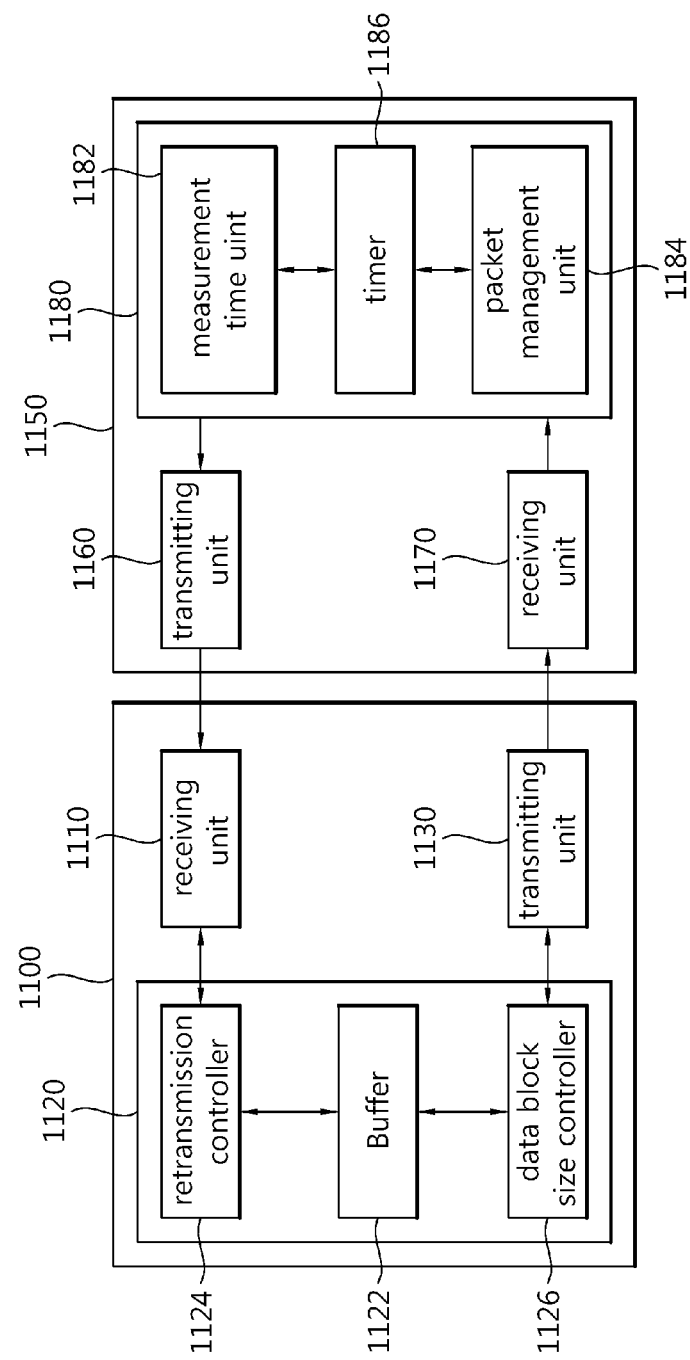
FIG. 11 is a block diagram schematically showing a structure of a transmitter and a receiver according to an embodiment of the present invention.

FIG. 11 is a block diagram schematically showing a structure of a transmitter and a receiver according to an embodiment of the present invention.

Referring to FIG. 11, a transmitter 1100 includes a receiving unit 1110, a transmitting unit 1130, and a data burst manager 1120.

The receiving unit 1110 receives an RRC message from an eNB. The RRC message may include a value of a timer for controlling an operation according to a start/end time of a data burst, which is used in a receiver 1150. Data transmission may be controlled by considering the value of the timer.

The data burst manager 1120 may include a buffer 1122, a retransmission controller 1124, and a data block size controller 1126. For example, if a data block to be transmitted is assumed as an RLC PDU, the data burst manager 1120 may be an RLC entity.

When data block size controller 1126 in transmitting side of an AM RLC entity forms AMD PDUs from RLC SDUs by checking the buffer (1122), it shall segment and/or concatenate the RLC SDUs so that the AMD PDUs fit within the total size of RLC PDU(s) indicated by lower layer at the particular transmission opportunity notified by lower layer. The retransmission controller 1124 in transmitting side of an AM RLC entity supports retransmission of RLC data PDUs (ARQ).

If the RLC data PDU to be retransmitted does not fit within the total size of RLC PDU(s) indicated by lower layer at the particular transmission opportunity notified by lower layer, the AM RLC entity can re-segment the RLC data PDU into AMD PDU segments. When the transmitting side of an AM RLC entity forms AMD PDUs from RLC SDUs received from upper layer or AMD PDU segments from RLC data PDUs to be retransmitted, it shall include relevant RLC headers in the RLC data PDU.

The transmitting unit 1130 transmits the constructed RLC PDU. Herein, the receiving unit 1110 and the transmitting unit 1130 in the transmitter 1100 are constructed as one Radio Frequency unit. The data burst manager 1120 may include into a single processor or the one processor can segment and/or concatenate the data burst into the size predetermined of the data block and retransmit the data block as a corresponding to the entity of the data burst manager 1120 according to this invention.

Meanwhile, the receiver 1150 may include a transmitting unit 1160, a receiving unit 1170, and a data burst throughput unit 1180.

The transmitting unit 1160 may transmit an RRC message including a predetermined value of a timer. The receiving unit 1170 receives a data block in regard to a data burst.

The data burst throughput unit 1180 includes a measurement time unit 1182 for determining a measurement duration to measure a data burst, a packet management unit 1584 for confirming a data amount, and a timer 1186 for performing a start/end/restart in accordance with the received data block. The timer 1186 may be included in the measurement time unit 1182 for determining the start time and end time at which the data burst is generated.

If it is confirmed that the data block is received in the receiving unit 1170, the timer starts to be driven. Further, a time at which the first data block is received is set to T2, and data block reception is waited for. Herein, the set T2 includes that a start point at which a data burst begins since the transmitter buffer(1122) becomes a BSR with value larger than 0 whose BSR was previously 0, that is, it considers that the BSR is changed from 0 to certain value.

Whereas, if there is need to receive data block by checking the reception buffer (not described at the FIG. 11), the timer restarts to receive data block to be retransmitted. Also the timer expires when a data burst is ended after the timer run with the predetermined timer value, and set the end time to T1. The set T1 includes that an end point at which the data burst ends since the transmitter buffer(1122) becomes a BSR with value equal to 0 whose BSR was previously larger than 0, that is, it considers that the BSR is changed from certain value to 0.

The measurement time unit (1182) decides a measurement period of the transmission for the data burst using checking the set T1 and T2, i.e. ThpTimeUL, as T1 - T2.

The packet management unit (1184) calculates the throughput of the data burst as volume of successfully received PDCP SDUs during the measurement period as ThpTimeUL.

Therefore, the data burst throughput unit 1180 provides the calculated throughput as a parameter for effectively managing a wireless resource or as a verification parameter for confirming service quality to a higher network. Herein, the transmitting unit 1160 and receiving unit 1170 of the receiver may include one radio frequency unit. In addition, the data burst throughput unit 1180 may also process as a processor, since it is included in a processor when operating or since one processor performs an operation according to the present invention.

Figure 12:
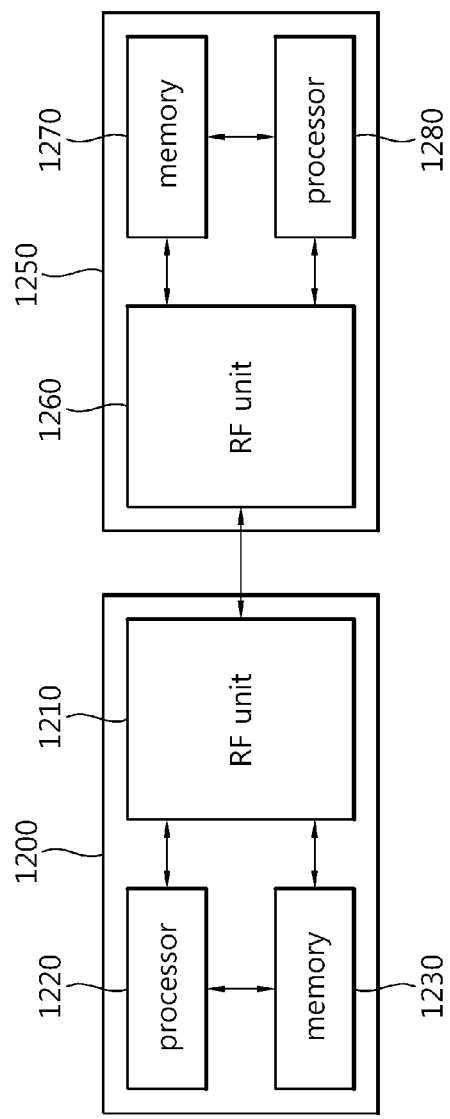
FIG. 12 schematically shows a structure of a transmitter and a receiver according to another embodiment of the present invention.

FIG. 12 is a block diagram showing a wireless communication system according to an embodiment for another aspect of the present invention.

A wireless device 1200 includes an RF unit 1210, a processor 1220, and a memory 1230. The RF unit 1210 is coupled to the processor 1220, and transmits and/or receives a radio signal. The processor 1220 implements the proposed functions, procedures, and/or methods. In the embodiments of the FIG. 4 to FIG. 10, the operation of the UE can be implemented by the processor 1220. The memory 1230 is coupled to the processor 1220, and stores a variety of information for driving the processor 1220.

A BS 1250 includes an RF unit 1260, a processor 1280, and a memory 1270. The RF unit 1260 is coupled to the processor 1280, and transmits and/or receives a radio signal. The processor 1280 implements the proposed functions, procedures, and/or methods. In the embodiments of FIG. 4 to FIG. 10, the operation of the BS can be implemented by the processor 1280. The memory 1270 is coupled to the processor 1280, and stores a variety of information for driving the processor 1280.

The technical concept of the present invention is based on provisional documents as described in the below.

<Start of Priority Document>

[Invention 1] Burst_Timer

A timer called Burst_Timer is used by the receiver (eNB for UL, UE for DL) to detect a data burst.

When the receiver receives a data block while the Burst_Timer is not running, the receiver shall:

Start the Burst_Timer;

Set T2 to the time the Burst_Timer starts (or the time the receiver receives the data block).

When the receiver receives a data block while the Burst_Timer is running, the receiver shall:

Restart the Burst_Timer.

When the Burst_Timer expires, the receiver shall:

Set T1 to the time the Burst_Timer expires.

The receiver can be either an eNB or a UE.

The receiver decides the transmission time of the data burst, i.e. ThpTimeUL, as T1 - T2.

The receiver calculates the throughput of the data burst as [(volume of successfully received PDCP SDUs during ThpTimeUL)/ThpTimeUL].

The above operation can be performed in one of Layer 2 radio protocols, i.e. MAC (HARQ), RLC, or PDCP. For MAC, the operation is applied to a UE, and for RLC and PDCP, the operation is applied to each RB.

The data block can be one of MAC PDU, MAC SDU, RLC PDU, RLC SDU, PDCP PDU, or PDCP SDU.

The layer 2 control PDUs (e.g. MAC Control Element, RLC Control PDU, PDCP Control PDU) are not considered as data blocks, so the Burst_Timer operation is not applied to the layer 2 control PDUs.

The value of the Burst_Timer is signalled from eNB to UE by one of RRC message, MAC Control PDU, RLC Control PDU, or PDCP Control PDU.

If the above operation is performed in MAC HARQ, the data block may be limited to a new data block, i.e. only the initial transmission is considered and retransmission is not considered.

If the above operation is performed in AM RLC, the behavior at Burst_Timer expiry is changed as below to cope with possible RLC retransmission.

When the Burst_Timer expires, the receiver shall:

If an RLC Data PDU remains in the reception buffer (i.e. out-of-sequence RLC Data PDU):

Restart the Burst_Timer;

Else:

Set T1 to the time the Burst_Timer expires.

[Invention 2] Explicit indication

The transmitter indicates to the receiver, the start and the end of the data burst.

The transmitter can be either a UE or an eNB, and the receiver can be either an eNB or a UE.

The transmitter triggers to send a start indication when a data block is received from the upper layer to the empty transmission buffer.

The transmitter triggers to send an end indication when the transmission buffer becomes empty (after the transmission of the last data block).

The transmitter sends the start indication just before the first data block of the data burst, and sends the end indication right after the last data block of the data burst.

The data block can be one of MAC PDU, MAC SDU, RLC PDU, RLC SDU, PDCP PDU, or PDCP SDU.

The indication can be sent as one of MAC Control Element, RLC Control PDU, or PDCP Control PDU.

When the receiver receives a start indication, it sets T2 to the time it receives the start indication.

When the receiver receives an end indication, it sets T1 to the time it receives the end indication.

The receiver decides the transmission time of the data burst, i.e. ThpTimeUL, as T1-T2.

The receiver calculates the throughput of the data burst as [(volume of successfully received PDCP SDUs during ThpTimeUL)/ThpTimeUL].

The transmitter can transmit the same indication multiple times to increase the robustness.

When the receiver receives the same indication multiple times, the receiver applies T2 or T1 to the first time the start or end indication is received.

[Invention 3] Indication by BSR (Buffer Status Report)

When the eNB receives a BSR with value larger than 0 from the UE whose BSR was previously 0, it considers that a data burst starts, and sets T2 to the time;

when the BSR (with value larger than 0) is received, or when the UL grant is allocated to the UE, or when a data block is received from the UE for the first time after the BSR is changed from 0 to certain value.

When the eNB receives a BSR with value equal to 0 from the UE whose BSR was previously larger than 0, it considers that a data burst ends, and sets T1 to the time;

when the BSR (with value equal to 0) is received, or when the last data block is received before the reception of the BSR with 0.

The UE can trigger a BSR when the BSR value is changed from 0 to a certain value. (indication for burst start)

The UE can trigger a BSR when the BSR value is changed from a certain value to 0. (indication for burst end)

The BSR value can be evaluated per LCG (Logical Channel Group). It means that the above operation can be applied to a LCG not to a UE.

When the eNB receives a BSR of a LCG with value larger than 0 from the UE whose BSR of the LCG was previously 0, it considers that a data burst starts, and sets T2 to the time;

when the BSR of the LCG (with value larger than 0) is received, or when the UL grant is allocated to the UE, or when a data block is received from the UE for the first time after the BSR of the LCG is changed from 0 to certain value.

When the eNB receives a BSR of a LCG with value equal to 0 from the UE whose

BSR of the LCG was previously larger than 0, it considers that a data burst ends, and sets T1 to the time;

when the BSR of the LCG (with value equal to 0) is received, or when the last data block is received before the reception of the BSR of the LCG with 0.

The UE can trigger a BSR when a BSR value of a LCG is changed from 0 to a certain value. (indication for burst start)

The UE can trigger a BSR when a BSR value of a LCG is changed from a certain value to 0. (indication for burst end)

<End of Priority Document>

The processor may include application-specific integrated circuit (ASIC), other chipset, logic circuit and/or data processing device. The memory may include readonly memory (ROM), random access memory (RAM), flash memory, memory card, storage medium and/or other storage device. The RF unit may include baseband circuitry to process radio frequency signals. When the embodiments are implemented in software, the techniques described herein can be implemented with modules (e.g., procedures, functions, and so on) that perform the functions described herein. The modules can be stored in memory and executed by processor. The memory can be implemented within the processor or external to the processor in which case those can be communicatively coupled to the processor via various means as is known in the art.

In view of the exemplary systems described herein, methodologies that may be implemented in accordance with the disclosed subject matter have been described with reference to several flow diagrams. While for purposed of simplicity, the methodologies are shown and described as a series of steps or blocks, it is to be understood and appreciated that the claimed subject matter is not limited by the order of the steps or blocks, as some steps may occur in different orders or concurrently with other steps from what is depicted and described herein. Moreover, one skilled in the art would understand that the steps illustrated in the flow diagram are not exclusive and other steps may be included or one or more of the steps in the example flow diagram may be deleted without affecting the scope of the present disclosure.

The invention claimed is:

1. A method of measuring a throughput of a data burst in a wireless communication system, the method comprising:
   determining, by a base station, a start point (T2) at which the data burst begins using a timer;
   determining, by the base station, an end point (T1) at which the data burst ends using the timer;
   measuring, by the base station, the throughput of the data burst based on the start point (T2) and the end point (T1),
   wherein the throughput of the data burst is measured by a following equation:

$$\text{If} \sum ThpTimeU1 > 0,$$
$$\frac{\sum ThpVolU1}{\sum ThpTimeU1} \times 1000 [kbits/s] \quad \langle\text{Equation}\rangle$$
$$\text{If} \sum ThpTimeU1 = 0, \ 0[kbits/s],$$

where ThpTimeU1=0 if the data burst is small enough to be transmitted in one transmission time interval (TTI), otherwise ThpTimeU1=T1-T2,
   ThpVolU1 is a data volume for the data burst received between the start point (T2) and the end point (T1),
   the start point (T2) is a point in time when the timer starts to run by checking that a first data block for the data burst is received from a user equipment (UE), and
   the end point (T1) is a point in time when the timer expires after the timer runs with a predetermined value.

2. The method of claim 1, wherein the start point (T2) is a point in time when the timer starts to run after receiving the first data block to indicate that a buffer size of the UE becomes greater than zero for at least one radio bearer of the UE.

3. The method of claim 1, wherein the end point (T1) is a point in time when the timer expires after receiving a last data block to indicate that a buffer size of the UE becomes zero for all radio bearers of the UE.

4. The method of claim 1, wherein the timer restarts to run, not to expire when a data block for the data burst is needed to be received by checking a sequence of the data block in a reception buffer.

5. The method of claim 1, wherein the first data block includes one of an MAC (medium access control) PDU (packet data unit), MAC SDU (service data unit), RLC (radio link control) PDU, RLC SDU, PDCP (packet data convergence protocol) PDU, or PDCP SDU.

6. The method of claim 1, wherein a value of the timer is signaled from the base station to the UE with one of an RRC (Radio Resource Control) message, MAC Control PDU, RLC Control PDU, or PDCP Control PDU.

7. A base station for measuring a throughput of a data burst in a wireless communication system, the base station comprising:
   a radio frequency(RF) unit for receiving a radio signal; and
   a processor, operatively coupled with the RF unit, configured to:
      determine a start point (T2) at which the data burst begins using a timer,
      determine an end point (T1) at which the data burst ends using the timer, and
      measure the throughput of the data burst based on the start point (T2) and the end point (T1),
   wherein the throughput of the data burst is measured by a following equation:

$$\text{If} \sum ThpTimeU1 > 0, \ \frac{\sum ThpVolU1}{\sum ThpTimeU1} \times 1000 [kbits/s] \quad \langle\text{Equation}\rangle$$
$$\text{If} \sum ThpTimeU1 = 0, \ 0[kbits/s],$$

where ThpTimeU1=0 if the data burst is small enough to be transmitted in one transmission time interval (TTI), otherwise ThpTimeU1=T1-T2,
   ThpVolU1 is a data volume for the data burst received between the start point (T2) and the end point (T1),
   the start point (T2) is a point in time when the timer starts to run by checking that a first data block for the data burst is received from a user equipment (UE), and
   the end point (T1) is a point in time when the timer expires after the timer runs with a predetermined value.

8. The base station of claim 7, wherein the start point (T2) is a point in time when the timer starts to run after receiving the first data block to indicate that a buffer size of the UE becomes greater than zero for at least one radio bearer of the UE.

9. The base station of claim 7, wherein the end point (T1) is a point in time when the timer expires after receiving a last data block to indicate that a buffer size of the UE becomes zero for all radio bearers of the UE.

10. The base station of claim 7, wherein the timer restarts to run, not to expire when a data block for the data burst is needed to be received by checking a sequence of the data block in a reception buffer.

11. The base station of claim 7, wherein the first data block includes one of an MAC (medium access control) PDU (packet data unit), MAC SDU (service data unit), RLC (radio link control) PDU, RLC SDU, PDCP (packet data convergence protocol) PDU, or PDCP SDU.

12. The base station of claim 7, wherein a value of the timer is signaled from the base station to the UE with one of an RRC (Radio Resource Control) message, MAC Control PDU, RLC Control PDU, or PDCP Control PDU.

\* \* \* \* \*